United States Patent [19]

McIntyre

[11] 3,800,619

[45] Apr. 2, 1974

[54] REMOTE CONTROL REARVIEW MIRROR

[75] Inventor: Matthew McIntyre, Jackson, Tenn.

[73] Assignee: Jervis Corporation, Grandville, Mich.

[22] Filed: Nov. 24, 1972

[21] Appl. No.: 309,096

[52] U.S. Cl. .............................. 74/501 M, 74/501 R
[51] Int. Cl. .............................................. F16c 1/10
[58] Field of Search ............ 74/501 R, 501 P, 501 M

[56] References Cited
UNITED STATES PATENTS
3,057,262  10/1962  Jacobson ........................ 74/501 M
3,625,085  12/1971  Schrode ......................... 74/501 M Primary Examiner—Leonard H. Gerin
Assistant Examiner—Frank H. McKenzie, Jr.
Attorney, Agent, or Firm—Miller, Morriss, Pappas & McLeod

[57] ABSTRACT

A new and improved remote control rearview mirror employing mechanical Bowden wire actuation where the core cables or wires are always in tension and where the actuator control element is substantially miniaturized by compacting the cable connections via a slotted housing and by including a new and improved vibration eliminating support at the mirror end where the spherical caging is spring augmented beyond the tension originating at the actuator end.

4 Claims, 10 Drawing Figures

PATENTED APR 2 1974 3,800,619

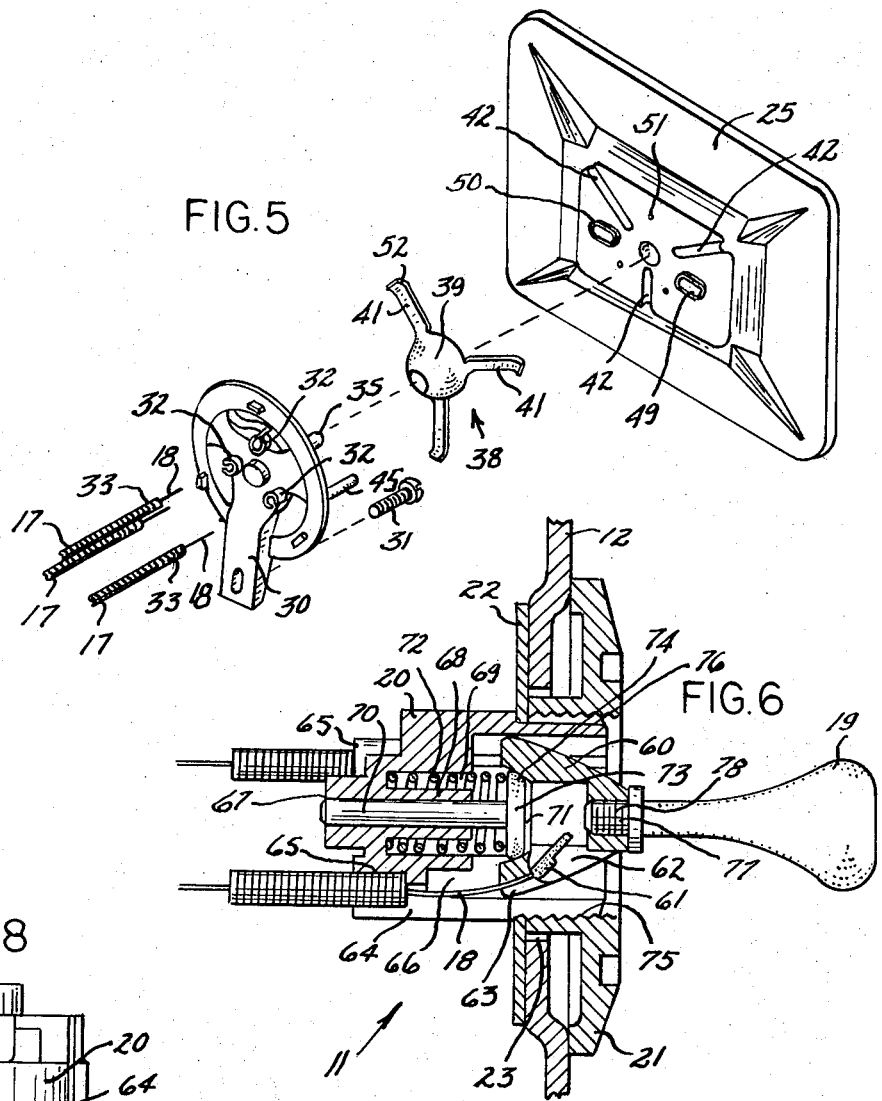
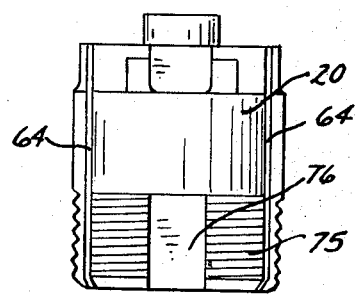
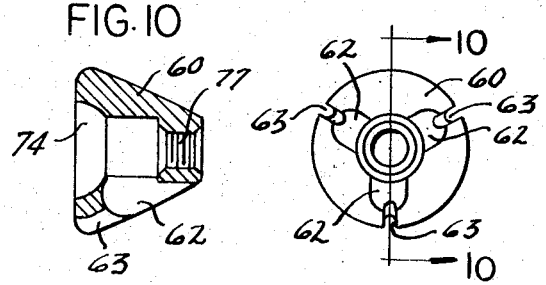

REMOTE CONTROL REARVIEW MIRROR

The present invention is a new and improved remote control rearview mirror of the mechanical Bowden wire or cable type and where all cables are continuously under tension. The improvement is in miniaturization of the actuating control while providing the principal cable or wire tension source in the actuator and where a stabilizing spherical socket spring cage allows movement of the mirror on the mirror pivot under concentric applied stressing, as will be seen.

PRIOR ART

The prior art in this field is best represented by the work of Jacobson expressed in U.S. Pat. No. 2,931,245 and Leidel in the U.S. Letters Pat. No. 3,474,686 and 3,473,823. In particular, the prior art discloses bulky or elongate actuator construction and the present work improves the actuator by effective clustering to achieve miniaturization and at the mirror end provides a new stabilizing support.

Accordingly, the principal object of the present invention is to provide an improved three wire remote control rearview mirror construction by compacting the actuator and by providing better support to the mirror; another object is to teach economy of space and material; still another object is to utilize the escutcheon nut for increasing the structural stability of the actuator and preventing removal of the Bowden wire elements until the escutcheon element is backed off. Other objects including ease of assembly, construction and durability will be better appreciated as the description proceeds.

GENERAL DESCRIPTION

In general, the actuator of the present invention has been compressed and miniaturized while assuring ease of installation and attachment of Bowden wire core elements to the actuator without sacrifice of sheath buttresses and providing substantially straight line access to the actuator knob connection. The cylindrical actuator housing having clustered cable sockets at one end and open at the other end has a central and axial opening therethrough which provides an axial journal for a pivot pin having a spherical segment on its head. A spring recess is provided around the central opening and a compression spring is seated in the recess and extends axially therefrom into a larger connecting cavity in the housing. This is the actuator cavity and the actuator is insertable axially into the cavity and its base is spherical to mate against the head of the pivot pin. The housing is provided with a plurality of clustered radial pockets accessible from the end of the housing opposite the threaded end. This shortens the needed length. Slots of a radial disposition and registrable with the pockets run the length of the housing and break into the pockets and into the cavity through the threaded portion of the cylindrical wall. Bowden wire elements comprising sheaths and core wires are located in the pockets with the sheaths buttressed against the ends thereof and the core wires then pass registrably through the slots and into the adjacent actuator cavity. This permits them to be connected to the actuator very easily and when this assembly is used, the knob on the actuator element simply compresses the spring allowing the core wires with attached ferrules to be pressed into registering slots in the actuator element with the ferrules supported under tension in lock pockets or cavities. The actuator is connected to the remote mirror by means of the Bowden wire elements. At the mirror end the sheaths are buttressed and clustered against a bracket and the core wires extend to connections with the case or back of a mirror. A male spherical seat is provided by the bracket against which the mirror back spherically bears. A spider structure also nests in a spherical journal seat at the base of the male spherical extension and includes spring legs which extend outwardly and forwardly to compressed relation against the mirror back on assembly. The mirror back is slotted to slidably receive the resiliently extended feet. Posts extend from the bracket and into the case or mirror back and are buffered from contact with the base as by grommets. This allows universal tilting on the spherical center but prevents rotation of the mirror. As will be appareciated, the bracket may be the actual support for the mirror or may be fastened to an ornamental mirror shroud or encasement. The consequent miniaturization of the actuator allows more extensive relocation of the actuator element in the vehicles where the mirror is used.

IN THE DRAWINGS

FIG. 5 is an exploded perspective view indicating the relationship of parts at the mirror support at assembly.

FIG. 6 is a cross section elevation view taken on the line 6—6 of FIG. 1 and showing the actuator assembly in accord with the present invention.

FIG. 7 is an end elevation view of the radially slotted actuator housing of the present invention.

FIG. 8 is a side elevation view taken as indicated on the line 8—8 of FIG. 7 and indicating the external configuration of the actuator housing.

FIG. 9 is a front elevation view of the actuator element of the knob assembly and indicating the wire slots and ferrule support pockets.

FIG. 10 is a full cross section side elevation view of the actuator element taken on the line 10—10 of FIG. 9.

SPECIFIC DESCRIPTION

Figure 1:
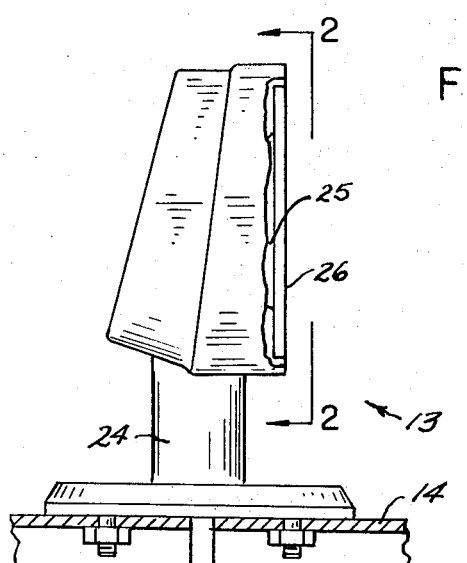
FIG. 1 is an elevation view of an actuator element secured through a body portion of the automobile and a remote mirror assembly secured externally of an automobile and the two are operably connected as by the Bowden wire elements shown therebetween in accord with the present invention.
Figure 2:
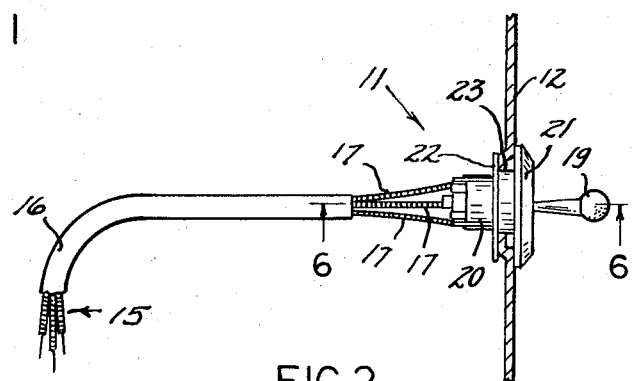
FIG. 2 is a partial front elevation view taken on the line 2—2 of FIG. 1 and showing the mirror in its ornamental encasement.
Figure 2:
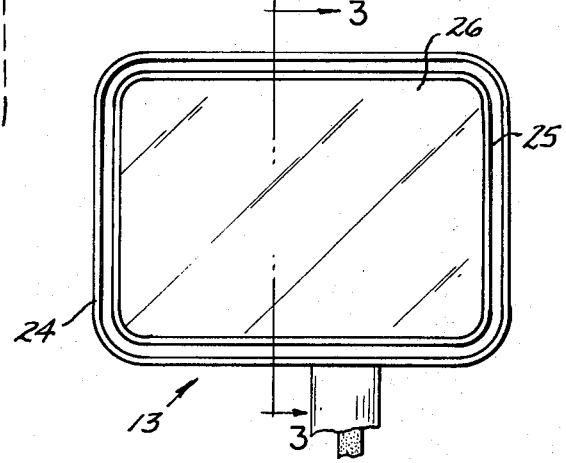

Referring to the drawings and particularly to the FIG. 1 thereof, the assembled relationship of the invention is best revealed as installed in a vehicle such as an automobile. The actuator assembly 11 is shown secured to a body panel 12 of a vehicle. The mirror assembly 13 is shown remote from the actuator assembly 11 and secured to a vehicle body element 14 such as a fender or door. The Bowden wire elements 15 in their tube 16 comprise the compression sheaths 17 and the tension cores 18 which may be monofilamentary or braided material. The sheaths 17 provide the lineal flexible bearing for the cores 18, usually wound metal. The core pieces 18, as will be seen, extend from the ends of each of the sheath elements 17 and are operably connected at one end to the mirror assembly 13 and at the other end to the actuator assembly 11, the sheaths 17 being buttressed in a compression relationship and the cores 18 being in tension and selectively movable by movement of the actuator knob 19 so that motion in the mirror assembly 13 mimicks the selected motion at the actuator assembly 11. The actuator assembly 11 includes the actuator housing 20, an escutcheon element 21, a lock ring 22 and the housing is inserted in the opening 23 provided in the body panel 12 such as through the dash panel or door of a vehicle. The escutcheon element 21 draws the housing element 20 and ring 22 into firm non-rotating engagement through the panel 12 and the knob 19 extends therefrom, its movement restricted by the escutcheon element 21 or interior of the housing 20.

Figure 3:
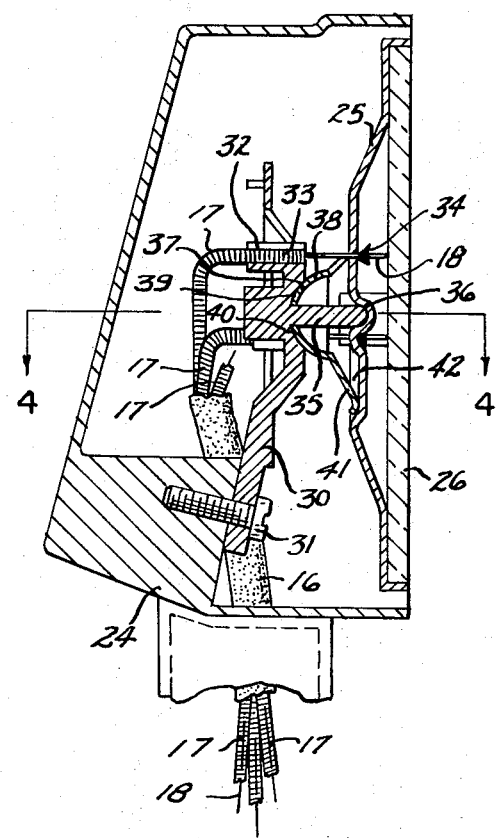
FIG. 3 is a cross section elevation view taken on the line 3—3 of the FIG. 2 and indicating the mirror support assembly.

At the mirror assembly 13, remote from the actuator assembly 11, the sheath elements 17 and the core elements 18 extend through the panel 14 and into the ornamental mirror encasement 24. As will be seen, the sheaths 18 are secured by bracketing means in gripping buttressed relation and the core pieces 18 extend to connection with the mirror back or case 25 which supports the mirror reflective face 26. As will also be seen, the mirror back 25 is pivotally supported by the bracket 30 and as the core pieces 18 are manipulated, the force vectors in the core pieces 18 cause corresponding equal motion in the mirror 26. A net tension in the core pieces 18 assures stable support against the pivot seats and supplemental stabilization is achieved in a spring spider and posts avoid chance rotation. In FIG. 3 the importance of non-rotation of the mirror surface 25 around its center is appreciated. In round mirrors, this feature is less important.

Figure 4:
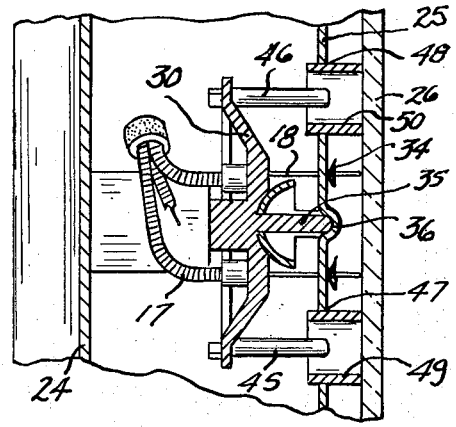
FIG. 4 is a cross section top plan view taken on the line 4—4 of FIG. 3 and best indicating the stabilizing posts and grommets.

FIG. 3 shows the bracketing of the mirror case 25 and the compression grip buttress support of the sheaths 17. The bracket 30 is secured within the ornamental housing by the screw 31 and includes socketlike receptacles 32 into which the sheath ends 33 are crimped and buttressed securely. By recessing the ornamental mirror case 24 to mate with the bracket 30, the bracket 30 is steadied against movement when the screw 31 is applied. Access to the screw 31 for insertion or removal is by tilting the mirror case 25 and inserting a fastener removal tool. The core pieces 18 extend from the ends 33 of the sheaths 18 and into the formed mirror back 25 where they are anchored as by ferrules 34 against removal. FIG. 3 also shows the noselike extension 35 from the center of the bracket 30 which nose 35 extends to spherical engagement in a mating dimple 36 in the mirror back 25. The nose extension 35 rises from the center of a spherically shaped seat or depression 37 in the face of the bracket 30. The spherical depression 37 surrounding the base of the nose extension 35 provides a seat for the matingly configured spring spider 38. The spherical head 39 of the spider 38 has an opening 40 at its center so that it slips over the nose extension 35 in a clearance relationship. The leg portions 41 of the spider 38 splay outwardly to guidable positioning in the grooves 42 which extend, as will be seen, radially in the back 25. Accordingly, when the core pieces 18 are tensioned, the dimple 36 is engaged on the nose 35 forming a limited universal pivot and the splayed legs 41 in the grooves 42 apply a spring counter force based on the spherical contact of head 39 on spherical seat 37. This provides a resilient stability for the mirror 26 and its case 25. In the three wire system shown, the three legs 41 of the spider 38 are provided in 120° intervals around the center indicated by dimple 36 and 60° out-of-phase with the core pieces 18. In addition, and by reference to FIG. 4, the bracket 30 includes two posts 45 and 46, both on a line extending through the nose piece 35 and spaced outboard therefrom on each side of the nose piece 35. These posts 45 and 46 are sufficiently long to extend into the back 25 of the mirror 26 through slotted openings 47 and 48 as seen in the FIG. 4. Grommets 49 and 50, respectively, made from resilient resin material provide a cushion-like rotation limiting support for the mirror 26 and back 25 while allowing pivoting on the dimple seat 36. The slots 47 and 48 are in-line with each other on each side of dimple 36, the slot accommodating the greater horizontal dimension of the elongated mirror 26. The socket-like receptacles 32 integral with the bracket 30 are seen best in FIG. 4 and as previously described, the ends 33 of the sheaths 17 are inserted therein and are clamped down upon. This secures sheaths 33 in clamped and buttressed relation while the core pieces 18 extend to connection with the mirror back 25 as by ferrules 34.

By reference to FIG. 5, the assembly relationships are made more clear since the bracket 30 is isolated from the mirror case 24 and the three sockets 32 are indicated ready to receive the sheaths 17 and the ends 33 thereof. The receptacles 32 are shown slotted so that upon insertion of the sheaths 17 and ends 33, the sheaths 17 can be tightly held and buttressed while the core pieces 18 extend therethrough in guided running relation to connection with the back 25 of the mirror and through the openings 51 in general register with the bracket receptacles 32. As previously described, one method of securing the core elements 18 to the base 25 is by means of ferrules 34. The spring spider 38 with the three legs 41 and spherical center head 39 is best seen in assembly sequence to fit over the nose extension 35. The post 45 is also visible and is inserted into the grommet 49. Feet 52 on the ends of the legs 41 of the spider 38 rest in the grooves 42 and provide a compressive counter force at the mirror assembly 13 which stabilizes the mirror 26 against wobble. The posts 45 and 46 stabilize against rotation and avoid chatter by flank impingement on the grommets 49 and 50, respectively, at all times.

FIGS. 6–10 emphasize the construction of the actuator assembly 11 as secured to the automotive panel 12 and comprising an actuator housing 20, and actuator knob 19 on attached actuator body 60. The actuator body 60 with attached handle 19 is inserted in the open end of the actuator housing 29 and is coupled to the ends of the core pieces 18 outside of the housing 20 by insertion of the ferrules 61 into the ferrule cavities 62 and the connected slot 63. This is made possible by the full length radial slots 64 running the length of the housing 20 through the walls of the sheath pockets 65 flanking the housing 20 and into the central cavity 66 of the actuator housing 20. The slots 64 are sized to provide a running fit for the core pieces 18 and are spaced in 120° increments around the generally cylindrical housing 20. An opening 67 is provided through one end of the housing 20 and on the axis thereof. A boss portion 68 of the housing surrounds the opening 67 and extends into the central cavity 66 of the housing 20 to form a spring recess 69 coaxial around the boss 68. The opening 67 receives a spherical headed pin 70 and the head 71 of the pin 70 bears on a compression spring 72 located in the recess 69 and extending axially therefrom. A spherical segment surface 73 is provided on the head 71 of the pin 70 which spherically mates with a female spherical surface 74 in the base portion of the actuator body 60. When the spring 72 is compressed on assembly by the actuator body 60, a limited universal pivot is established at the interphase between actuator body 60 at surface 74 and the spherical surface 73 provided on the head 71 of the pin 70. This arrangement assures universal motion at the interphase and a net tension in all of the core pieces 18 on assembly. The housing 20 is externally threaded at one end and the threads 75 are broken by the slots 64 and a flat 76 which acts as a key when fitted to the washer mounting ring 22 which locks the actuator assembly 11 in the opening 23 in the panel 12 when the threaded escutcheon nut 21 is threaded onto the threads 75 as shown in FIG. 6 and in FIG. 1. The actuator body element 60 is axially internally threaded at one end and the threads 77 mate with the male threads 78 of the handle or knob 19 so that the decorative knob 19 is an extension of the actuator body as best fully illustrated in the FIGS. 9 and 10. Other fastening means are available for securing the escutcheon ring to the actuator body as by set screws or spring detent means clamping on the actuator body.

To appreciate the accommodations for assembly and service, the removal of the escutcheon nut 21 allows the actuator assembly to be backed out of the panel opening 23. Then by disconnecting the bracket 30 by removal of the screw 31 the mirror bracket 30 and assembly can be moved out of the mirror enclosure 24 for repair or service. In assembly, the mirror end may be completely assembled and the core pieces 18 and sheaths 17 cut to finish length. Then the free ends of the sheaths 17 are put into the pockets 65 at the actuator housing and ferruled core pieces are extended into the slots 64 and cavity 66. Then, the actuator body 60 is easily inserted in the cavity 66 to receive the core pieces 18 and ferrules 61. When the lock washer ring 22 and escutcheon nut 21 are applied, the ferrules 61 cannot escape from the actuator body 60 or the slots 64 closed by ring 22 and nut 21 as well as the perimeter of the opening 23 in the panel 12.

In operation, the size and complexity of the mirror actuator structure is substantially reduced and compacted. This accommodates the new structural tight clearance situations and greatly facilitates assembly and service since considerable preassembly is possible before mounting on a vehicle.

Having thus described my new and improved remote control mirror construction, others skilled in the art of three vector Bowden wire control of mirrors will readily appreciate the several contributions made in the field and any improvements or modifications obvious from the disclosures are intended to be included herein, limited only by the scope of my hereinafter appended claims.

I claim:

1. A new and improved remote control rearview mirror structure for automotive vehicles comprising:
   a cylindrical actuator housing having flanking plural clustered sheath pockets at one end and being longitudinally slotted whereby said slots extend radially from said pockets and into a central cavity formed in the other end of said housing over the length of said housing;
   a spring loaded spherical headed pin centrally and axially in said cavity of said housing;
   an actuator element in said cavity bearing spherically against said pin and;
   Bowden wire elements in each of said pockets of said housing and the core elements extending therefrom through said slots and each connected at the ends thereof to said actuator element;
   an escutcheon ring fastener over said cylindrical actuator housing and preventing escape of said core elements from said slots; and
   a spring cage supported mirror structure remote from said actuator housing and operably connected to said actuator element by means of said core pieces of said Bowden wire elements and the sheath portions of each of said Bowden wire elements buttressed in compression between said mirror structure and said actuator element.

2. An actuator construction for three wire tensioned Bowden wire systems in remote control rearview mirror combinations comprising:
   a cylindrical housing flanking plural sheath pockets at one end and open at the other end, said open end including a plurality of concentric recesses therein around a central axial opening therethrough, and said housing longitudinally and radially slotted for the entire length radially into said sheath pockets in the flanks of said housing and radially into said housing;
   a compression spring surrounding the central axial opening in said housing;
   a pin having a spherical segment head resting against said spring and in said central opening;
   an actuator element in said recess and radially confined by said housing and having fastening means in radial register with said slots and having a spherical segment port in mating with said spherical portion of said pin;
   Bowden wire elements, the sheath of which rests in said pockets and the core of which passes through said slots to connection with said actuator element; and
   an escutcheon ring secured to said housing at the end opposite said sheath pockets and providing a barrier over said slots in said housing.

3. In a three cable remote control rearview mirror structure, the improvement comprising:
   a generally cylindrical actuator housing externally threaded at one end having an axial opening therethrough, a spring recess coaxially around said opening and in spaced relation thereto;
   a control knob chamber extended coaxially in said housing;
   radially disposed sheath pockets at one end of and flanking said housing and a plurality of elongate radial slots running the entire length of said housing and into said chamber;
   a compression spring in said recess of said housing and extending axially therefrom;

a pivot pin in said opening and the head thereof resting on said spring and said head portion having a spherical surface;

a plurality of Bowden wire elements of core wire and sheath, said sheath resting in buttress relation in said pockets of said housing and said core pieces extending through said slots;

an actuator knob element in said knob chamber having a female spherical surface matching said spherical surface of said pivot pin and slotted to receive said core wires;

ferrules on the end of said core wires nestably positioned in said actuator control knob whereby said core wires cannot be withdrawn while said control knob is in said chamber of said housing;

an escutcheon nut threadably over said threaded portion of said housing securing said core wires against displacement from said slots; and a remotely located mirror assembly operably connected to said Bowden wire elements and selectively movable in accord with movement of said actuator knob.

4. In the combination of claim 3 including a mirror and back therefor;

a spherical bodied spider spring nested against said mirror back;

a support bracket receiving said Bowden wire elements in buttress relation against said sheaths and said core elements extending to connection with said back of said mirror and nestably supporting said spherical portion of said spider in a spherical pocket provided in said support bracket;

anti-rotation elements extending from said bracket in prevention of rotation of said back; and said spider in compressed relation between said back and said bracket.

* * * * *

UNITED STATES PATENT OFFICE
CERTIFICATE OF CORRECTION

Patent No. 3,800,619            Dated April 2, 1974

Inventor(s) Matthew McIntyre

It is certified that error appears in the above-identified patent and that said Letters Patent are hereby corrected as shown below:

Column 2, line 15, "base" should be -- case --

Column 2, line 18, "appareciated" should be -- appreciated --

Column 4, line 22, "elongated" should be -- elongate --

Column 6, line 30 (Claim 2), after "housing" insert -- having --

Signed and sealed this 10th day of September 1974.

(SEAL)
Attest:

McCOY M. GIBSON, JR.            C. MARSHALL DANN
Attesting Officer                 Commissioner of Patents